(No Model.)
E. O. BARTLETT & C. V. PETRAEUS.
PROCESS OF MAKING SUBLIMED LEAD PIGMENT.
No. 515,459.    Patented Feb. 27, 1894.
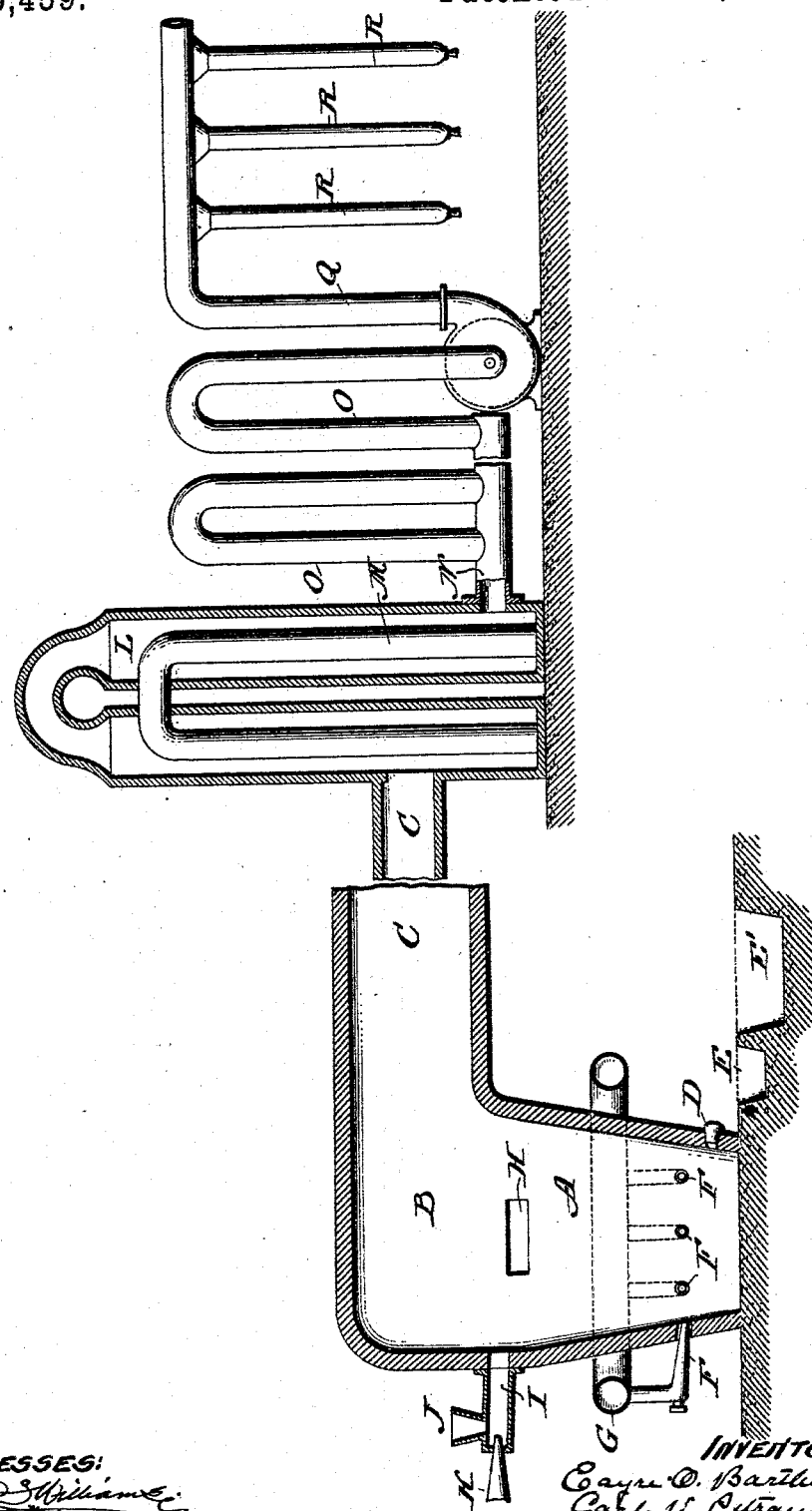

UNITED STATES PATENT OFFICE.

EAYRE O. BARTLETT AND CARL V. PETRAEUS, OF JOPLIN, MISSOURI, ASSIGNORS TO SAID BARTLETT AND OLIVER H. PICHER, OF SAME PLACE.

PROCESS OF MAKING SUBLIMED-LEAD PIGMENT.

SPECIFICATION forming part of Letters Patent No. 515,459, dated February 27, 1894.

Application filed October 28, 1893. Serial No. 489,341. (No specimens.)

*To all whom it may concern:*

Be it known that we, EAYRE O. BARTLETT and CARL V. PETRAEUS, both citizens of the United States, residing at Joplin, in the county of Jasper, in the State of Missouri, have invented a new and useful Improvement in Processes of Making Sublimed-Lead Pigment, of which the following is a true and exact description, reference being had to the accompanying drawing, which forms a part hereof.

Our invention relates to the manufacture of a pigment of or from the fumes of lead sulphate which are drawn off in the treatment of lead ores in certain furnaces. Heretofore such pigment has been made by various methods, for the most part as a by product in the smelting of lead ores.

The object of our present invention is to convert the lead of galena ore into pigment with the minimum production of metallic lead and without requiring the use in the furnace of other lead bearing mineral. In the patent to C. V. Petraeus, No. 492,832, of March 7, 1893, an approach to this desirable result is described, crushed raw galena being injected into the top of a low cupola furnace in which lead compounds are smelted and with the result of obtaining a larger proportion of lead pigment to metallic lead than was practicable with other processes known to us. We have now discovered that the powdered galena can be converted into pigment with a very much smaller production of metallic lead by charging into a low cupola furnace fuel and slag or slag forming material maintaining a high state of combustion in said furnace and injecting powdered or finely crushed galena into the upper part of the furnace; either above or in the top layers of the incandescent fuel; the products of combustion being afterward cooled and screened to separate the pigment. The slag charged into or formed in the furnace will keep the fuel clear of ash, giving free course to the air blast and insuring a proper degree of combustion, at the same time it will carry down with it all metallic particles formed from such particles of galena as are smelted and not reoxidized, though, as the particles of metals are not merged into others formed by lead bearing compounds charged into the furnace with the fuel, the proportionate quantity of the galena which is converted into metallic lead will be smaller than by the Petraeus process. The slag is allowed to run or is tapped at intervals from the furnace and any lead separated therefrom in the usual manner.

Reference being now had to the drawing which illustrates a plant adapted for use in our process shown in sectional elevation, A is a low cupola furnace having a hood B which communicates with a flue C made of refractory material and adapted to maintain the furnace gas and fume at a high temperature in order to purify the fume.

D is a tap hole from which the slag runs carrying any lead with it, E E' being lead and slag basins.

F F, &c., indicate tuyeres entering the furnace and connecting with the blast pipe G.

H is the charging door of the furnace through which the fuel and slag are charged into it.

I is a conduit entering the upper part of the furnace, J a hopper by which pulverized galena is fed to pipe I, and K a blast pipe through which an air blast is forced to drive the galena into the furnace.

L, M, N, O, indicate parts of familiar cooling flue systems commonly used for furnace gases in connection with screens to separate solid matters.

P is a fan and Q a conduit which leads to screens R.

We prefer to inject the galena into the furnace in admixture with and by means of a jet of air as shown, because in this way the ore is conveniently handled and also because the air aids in the rapid combustion of the finer parts of the ore, only the larger particles actually impinging on the top of the fuel bed.

Having now described our invention, what we claim as new, and desire to secure by Letters Patent, is—

1. The method of manufacturing a sublimed lead pigment which consists in charging fuel and slag forming material substantially free from lead compounds into a low cupola furnace and maintaining an energetic combustion therein, injecting pulverized galena into the upper part of the furnace and screening the products of combustion to separate the pigment.

2. The method of manufacturing a sublimed lead pigment which consists in charging fuel and slag forming material substantially free from lead compounds into a low cupola furnace and maintaining an energetic combustion therein, injecting pulverized galena in admixture with air into the upper part of the furnace and screening the products of combustion to separate the pigment.

EAYRE O. BARTLETT.
CARL V. PETRAEUS.

Witnesses:
W. A. HACKER,
W. H. PICHER.